(12) United States Patent
Zuck

(10) Patent No.: US 8,025,075 B2
(45) Date of Patent: Sep. 27, 2011

(54) SELF-CLEANING LOW EMISSION BLEEDER VALVE TYPE LIQUID LEVEL GAUGE

(75) Inventor: James C Zuck, Marshall, MI (US)

(73) Assignee: Marshall Excelsior Company, Marshall, MI (US)

( * ) Notice: Subject to any disclaimer, the term of this patent is extended or adjusted under 35 U.S.C. 154(b) by 621 days.

(21) Appl. No.: 12/098,020

(22) Filed: Apr. 4, 2008

(65) Prior Publication Data

US 2009/0250118 A1 Oct. 8, 2009

(51) Int. Cl.
*F16K 24/04* (2006.01)
(52) U.S. Cl. .............................................. 137/244
(58) Field of Classification Search ............ 137/244, 137/242, 15.07
See application file for complete search history.

(56) References Cited

U.S. PATENT DOCUMENTS

| 24,692 | A | * | 7/1859 | Bacon | 137/244 |
| 67,866 | A | * | 8/1867 | French | 137/244 |
| 1,491,622 | A | * | 4/1924 | Pickop | 137/244 |
| 5,667,687 | A | * | 9/1997 | Lange | 210/512.2 |
| 6,453,933 | B1 | * | 9/2002 | Oi et al. | 137/242 |

* cited by examiner

*Primary Examiner* — Kevin Lee
(74) *Attorney, Agent, or Firm* — Waters & Associates; John A. Waters

(57) ABSTRACT

A self-cleaning bleeder valve comprises an annular housing that is mounted in an opening in a pressure vessel, and a valve member that screws into the housing for movement toward and away from an orifice opening in the housing. The valve member includes a gasket seal and orifice drill at an inner end of the valve member. The orifice is positioned such that when the valve member is screwed into the annular housing, the drill extends through the orifice, automatically cleaning the orifice while restricting the rate of gas flow out of the orifice to the space between the drill and the orifice.

8 Claims, 1 Drawing Sheet

SELF-CLEANING LOW EMISSION BLEEDER VALVE TYPE LIQUID LEVEL GAUGE

BACKGROUND OF THE INVENTION

The present invention relates to bleeder valves or vent valves and more particularly to a bleeder valve having an internal drill that automatically cleans the gas escape orifice and provides a lower bleed rate than traditional bleeder valves.

A bleeder valve or vent valve is a valve connected to a pressurized container that, when released, permits the gas in the container to bleed or leak slowly out of the container. A typical bleeder valve includes an outer annular housing or valve body and an inner plug or valve member or adjusting screw that screws into the housing. The housing screws into an opening in a pressurized tank, and the valve member screws into the housing. A small opening, or orifice, in the housing permits the gas to escape from the interior of the pressurized container when the valve member is at least partially released. One problem with such valves is they become clogged from time to time and the orifice has to be cleaned out. Normally, it would be desired to have the orifice as small as possible, so the bleed rate would be as low as possible. When the orifice becomes clogged, however, it is usually necessary to clean the orifice using a conventional drill. The drill bit employed for cleaning out the orifice has to be large enough so that it will not break frequently. Because the orifice has to be substantially the same size as the drill bit, the orifice has to be correspondingly larger than would be optimum for a slow bleed rate in order to accommodate the larger drill bit. Additionally, cleaning out a clogged orifice with a conventional drill is generally cumbersome and inconvenient.

An object of the present invention is to provide an improved bleeder valve wherein the valve member includes an integral orifice cleanout drill that decreases the bleed rate of the gas and cleans the orifice without the need to drill out the orifice with traditional drilling methods.

SUMMARY OF THE INVENTION

In accordance with the present invention, a self cleaning bleeder valve comprises an inner plug or valve member that screws into an annular housing or valve body. The valve member includes a head that can be rotated by hand and a stem. A seal is mounted at the end of the stem and desirably extends beyond the stem. A drill mounted in the stem extends through and beyond the seal, along the axis about which the valve member rotates. The valve member has external threads that mate with threads in a receiving cavity of the annular housing when the valve member is inserted into the housing. The valve member can be inserted into the receiving cavity such that the seal of the valve member eventually abuts the orifice and surrounding wall of the annular housing, preventing the flow of gas from the pressure vessel when the valve member is rotated such that the seal is tightly sealed.

The valve member is adjustably movable in the annular housing toward and away from the orifice, such that movement of the valve member toward the orifice causes the drill to enter the gas escape orifice, slowing the rate at which the gas travels through the orifice and cleaning any dirt or debris that might accumulate in the orifice. The manual adjustment of the valve member achieves the same cleaning effect as conventional drilling methods without the inconvenience or risk of drill breakage associated with those conventional methods. Additionally, the presence of the drill in the orifice permits the user to decrease the flow rate of exiting gas beyond the limits of a conventional bleeder valve with an unobstructed orifice.

These and other features and advantages of the present invention will hereinafter appear, and for purposes of illustration but not of limitation, a preferred embodiment of the present invention is described below and shown in the appended drawings.

DETAILED DESCRIPTION OF PREFERRED EMBODIMENTS

Figure 1:
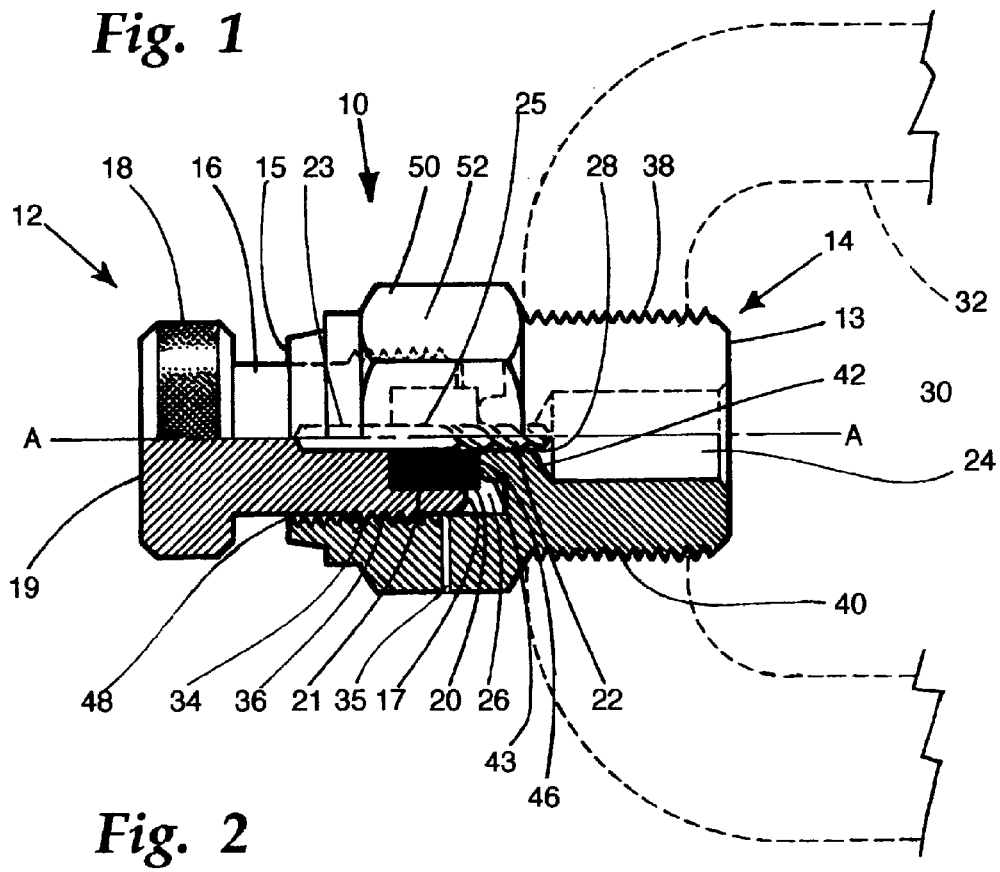
FIG. 1 is a partially sectional side elevational view of a conventional pressure vessel employing the bleed valve of the present invention.
Figure 2:
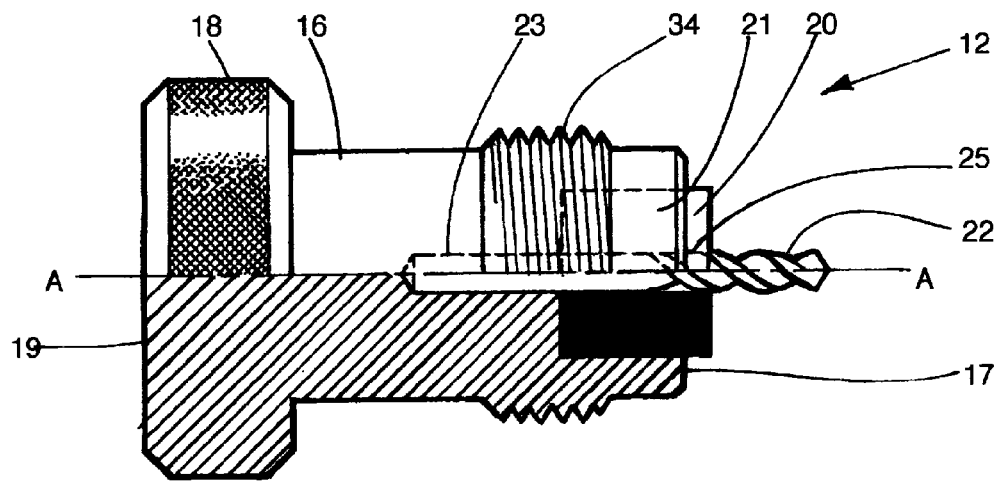
FIG. 2 is a partially sectional side elevational view of the valve member of the bleed valve of the present invention.

Referring to the drawings, a self-cleaning bleeder valve or vent valve 10 includes a valve member 12 (also referred to as an inner plug or adjustment screw) and an annular housing 14 (also referred to as a valve body). In the embodiment shown, valve member 12 is a body of rotation having a circular cross section and an axis "A" and having inner and outer ends 17 and 19, respectively. As used herein, "outer" will refer to the direction away from the pressure tank. The valve member includes an elongated stem 16 that extends from a head 18 at outer end 19 of the valve member. The head is generally circular in cross section and has a diameter larger than that of the stem. At the inner end 17 of the valve member is a thick gasket or seal 20. The seal may be made of conventional resilient seal material. The seal 20 desirably is a cylindrical member that is seated in a cylindrical cavity 21 in the end 17 of the stem 16. The seal may be secured within the cavity. The seal extends beyond end 17 of the stem and engages an annular seat 43 on the valve body 14 to seal the orifice closed when the stem is screwed snugly into the valve body. In an exemplary embodiment of the invention, wherein the stem diameter is about one and one-quarter inches, the seal is about $13/16$ inches in diameter and about $3/4$ inches long.

In accordance with the present invention, an orifice drill bit 22 is secured in the end of the stem and seal and extends generally along axis "A," beyond the seal. In the illustrated exemplary embodiment, the drill extends beyond the end of the stem about 0.73 inches. The drill extends through a hole 25 in the seal and is secured non-rotatably within a cavity 23 in the stem.

Valve body 14 is a generally annular housing having inner and outer ends 13 and 15, respectively. The stem 16 of the valve member 12 fits into an inlet opening 26 in an outer end 15 of the annular housing 14. The inlet 26 is separated from a pressurized gas inlet 24 of the annular housing by an annular wall 42 extending generally inward to create an orifice 28. In the exemplary embodiment, the orifice is a No. 54 size opening, or about 0.053 inches in diameter. Where the wall creates the orifice, a lip 43 extends toward the end 15 of the housing, creating an annular seat surrounding the orifice, through which the gas may travel. When the valve member is mounted in the annular housing, the drill extends into the orifice. Preferably, the stem 16 and the inlet 26 are provided with cooperating screw threads 34 and 36 that engage one another, so the valve member can be screwed into the housing.

Pressurized gas 30 flows from a pressure vessel 32 in a direction from the gas inlet 24 through the orifice 28, when the automatic orifice cleanout valve is connected to the pressure vessel 32. In the illustrated embodiment, valve 10 is mounted in an opening in a pressure tank by means of cooperating screw threads 38 on the exterior end surface 44 of the annular housing and an internally threaded bore 40 in the pressure tank. Adjacent to the exterior end surface 44 toward end 15 is a nut 50 that is preferably of a diameter larger than that of the bore 40, and which has flat portions 52 which fit into a conventional wrench for screwing the housing into the tank.

Valve member 12 screws into the annular housing 14 to bring seal 20 into engagement with seat 43 surrounding the orifice. In this position, the seal 20 creates a seal 46 with the seat 43, and drill 22 extends through the orifice 28 into the gas inlet 24. When the valve member 12 is rotated to create a tight seal 46, the pressurized gas 30 is prevented from escaping from the pressure vessel 32. The seal can be released by rotating the valve member in the opposite direction, thereby permitting gas to flow in a path from the pressure vessel, through the orifice around the flutes of the drill in the orifice, or through the orifice if the valve member is rotated so far as to completely disengage the drill from the orifice, between the seal and the valve seat into the receiving inlet 26, and then through threads 34 and 36, exiting the mouth 48 of the housing. The drill in the orifice decreases the rate of flow of the gas through the orifice while cleaning out the orifice.

The bleeder valve of the present invention can be installed as a unit or assembly in a tank. Alternatively, the valve member can be used alone and retrofitted in the valve bodies of existing bleeder valves of compatible size that are already installed in pressure vessels. In the latter capacity, the present replacement valve members comprise universal, self-cleaning replacement screws.

In addition to providing an automatic orifice clean out drill that is always available to clean out an orifice and prevent clogging, another important feature of the invention is that it substantially reduces the gas flow rate through the orifice when the valve is open. The reduction in flow rate can be as high as 70% in a conventional application using a conventional orifice and drill size of No. 54, which is about 0.053 inches. The savings achieved with the valve are significant. The same savings can be achieved in an existing installation when the valve member alone is used as a replacement valve member for an existing valve member without an integral drill.

Another desirable feature of the present invention is that the valve member can be completely removed from the annular housing. This makes it possible to easily replace the seal or replace the entire valve member when the seal becomes worn.

It should be recognized that the foregoing is merely exemplary of the preferred practice of the present invention and that various changes in the arrangements and details of construction of the embodiments disclosed herein may be made without departing from the spirit and scope of the present invention.

I claim:

1. A bleeder valve having an automatic orifice cleanout element, the bleeder valve being adapted to be mounted in a wall of a pressurized gas tank for bleeding pressurized gas therefrom, the valve comprising:
   a valve body that is sealably mounted in a wall opening in the wall of the tank, the valve body having a valve opening therein that provides fluid communication between an inner end of the valve body, which is in fluid communication with the interior of the tank, and an outer end, which is in fluid communication with the exterior of the tank, the valve opening including an enlarged internally threaded exterior portion and a reduced diameter interior portion, the reduced diameter interior portion of the opening comprising a flow restriction orifice that limits pressurized gas flow through the valve opening in the valve body from the interior to the exterior of the tank; and
   a valve member that fits in the valve opening in the valve body, the valve member including a threaded shank that threads into the enlarged portion of the valve opening, the valve member further including a narrow shaft extending in an axial direction from an inner end of the threaded shank, the shaft fitting into the flow restriction orifice as the valve member is threaded into the valve body, the shaft being shaped so that threading of the valve member into the valve body causes the shaft to remove or dislodge foreign material accumulated in the interior of the flow restriction orifice, leaving the flow restriction orifice clear of foreign matter, the shaft being formed so as to partially limit flow of pressurized gas between the shaft and an inner wall of the flow restriction orifice so that assembly of the bleeder valve with the shaft disposed in the flow restriction orifice causes the shaft to restrict gas release through the flow restriction orifice, the shaft having an axially extending external recess therein through which gas can flow when the shaft is in the orifice, the shaft being formed in the shape of a drill bit with the recess comprising an external groove and with the external groove having a sharpened edge for removing foreign material from the orifice, the shaft thus automatically cleaning out the orifice each time the valve member is threaded into the opening, and providing an increased restriction of the orifice with the valve member threaded in the opening.

2. A bleeder valve as in claim 1 wherein the valve member includes a seal surrounding the shaft that sealingly engages the valve body on an outer side of the orifice when the valve member is threaded snugly into the opening in the valve body, the seal closing the orifice and preventing bleeding until the valve member is threaded at least partially out of the opening in the valve body.

3. A bleeder valve as in claim 1, wherein the external groove in the drill bit comprises a helical groove in the drill bit.

4. A bleeder valve as in claim 3 wherein the drill bit is about $3/64$ inches in diameter and extends from the valve member by about one-half inch, with the axial depth of the orifice being small enough that the drill bit fits through the orifice when the valve member is inserted to an operating position in the valve body.

5. A bleeder valve as in claim 1 wherein the seal comprises a cylindrical member formed of resilient sealable material that fits in a recess in an end of the valve member and surrounds the shaft, the seal engaging a sealable shoulder between the orifice and the enlarged portion of the valve opening, the shoulder serving as a sealable seat for the seal.

6. A vent valve having an automatic orifice flow restrictor and cleanout element comprising:
   an annular valve body adapted to be mounted in a pressurized gas tank, the body having a gas inlet for pressurized gas at an inner end, a valve member inlet in an outer end for receiving a valve member, and an orifice between the valve member inlet and the gas inlet through which the pressurized gas can flow; and
   a valve member having an elongated stem that screws into the valve member inlet in the valve body, the valve member having a head at an outer end, a compressible seal at an inner end opposite the head, and an integral drill bit mounted axially in the inner end so as to extend through the orifice when the valve member is threaded into the valve body, the drill bit being shaped to remove foreign material that becomes lodged in the orifice and to restrict the opening in the orifice.

7. A vent valve according to claim 6 wherein the valve member is mounted in the valve body by means of a threaded connection, such that rotation of the valve member moves the drill bit and seal toward or away from the pressurized gas inlet.

8. A vent valve according to claim 6 wherein the exterior of the annular valve body is threaded, such that it may be rotatably connected to a threaded bore in the wall of a pressure vessel.

* * * * *